Jan. 10, 1961　　LE ROY V. OXLEY ET AL　　2,967,600
MASTER AND SLAVE CONTROL TYPING SYSTEM
AND STRUCTURAL UNITS FOR USE THEREIN
Filed May 24, 1955　　　　　　　　　　　9 Sheets-Sheet 5
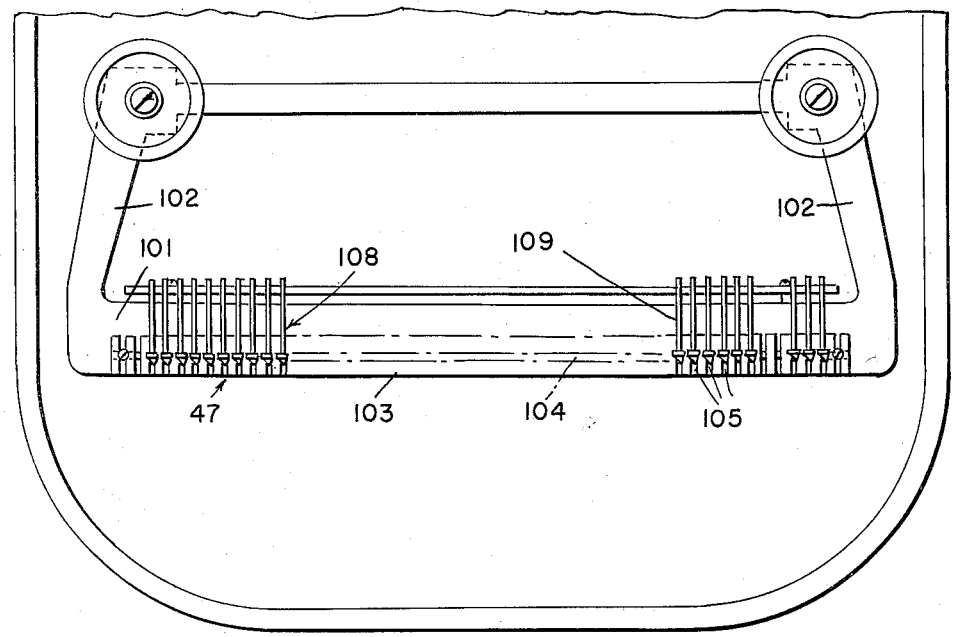
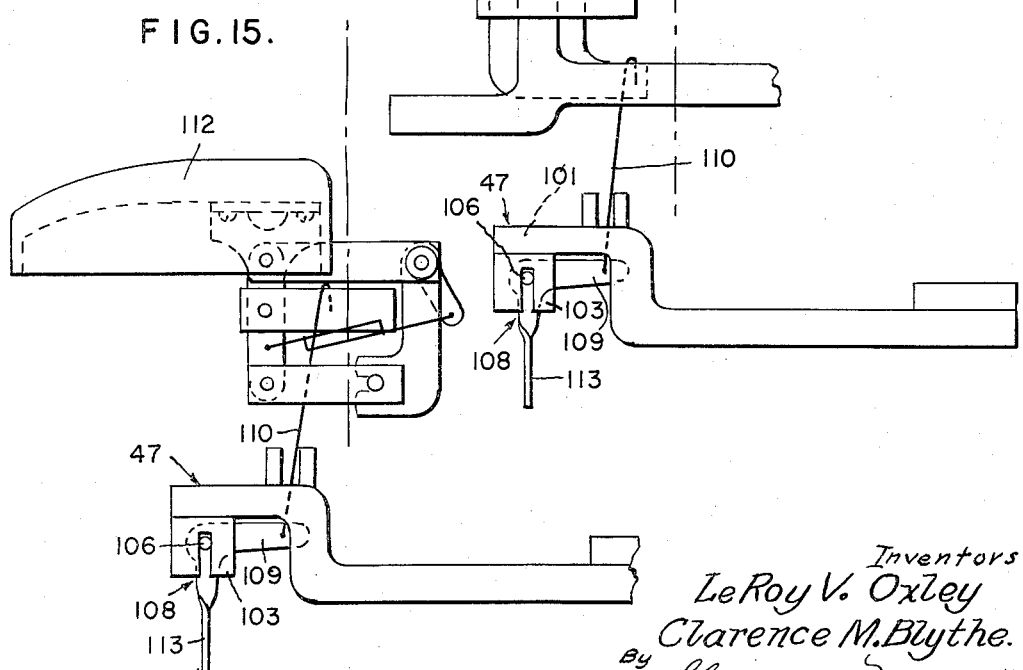

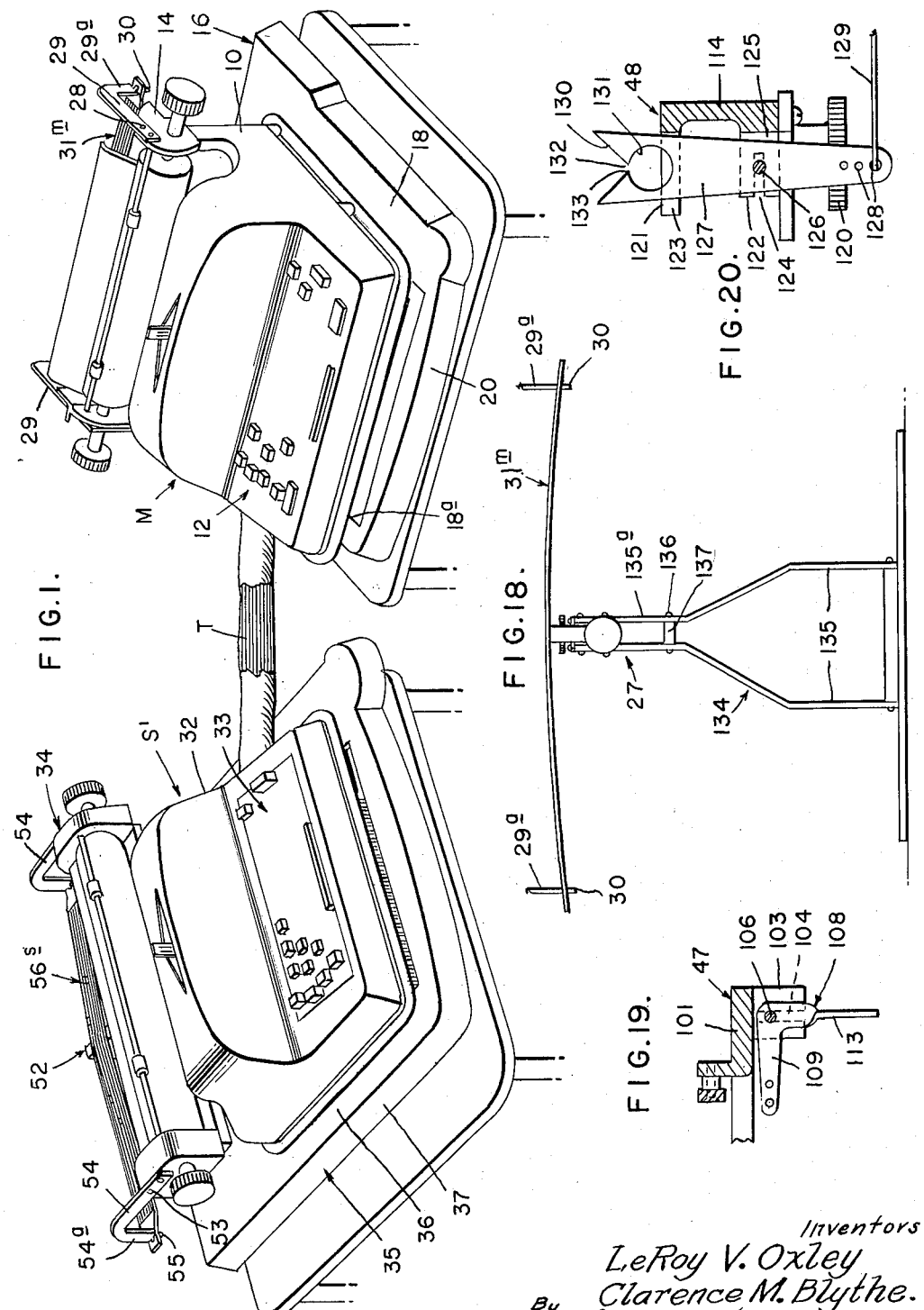

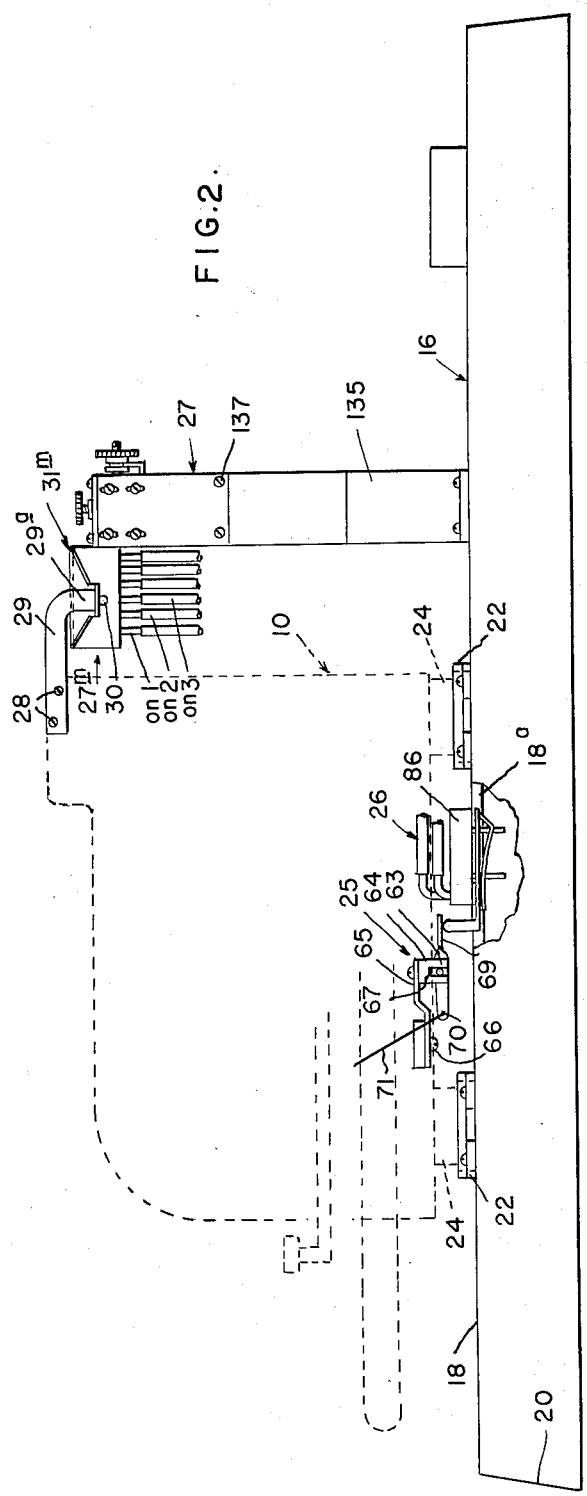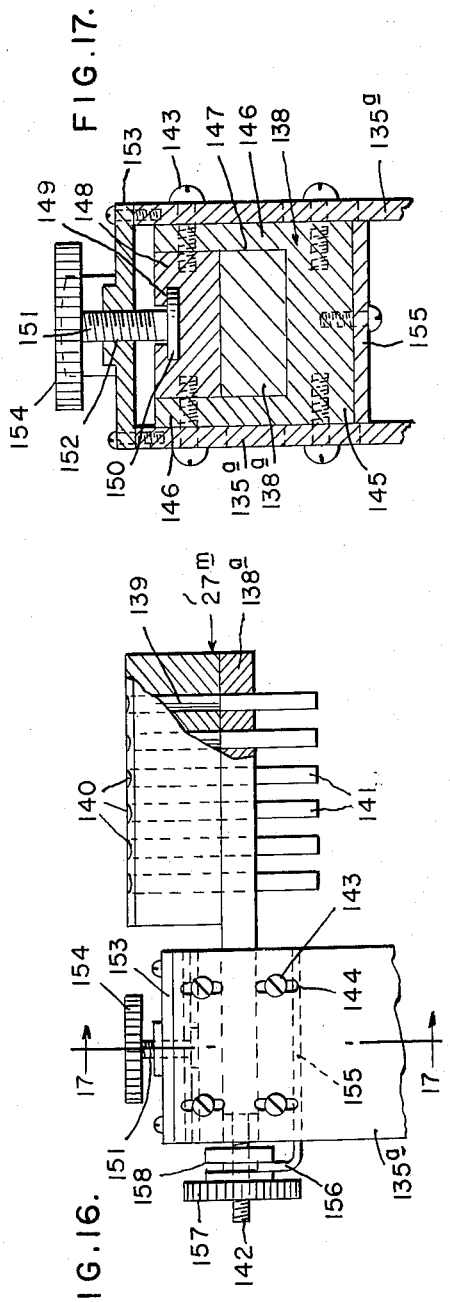

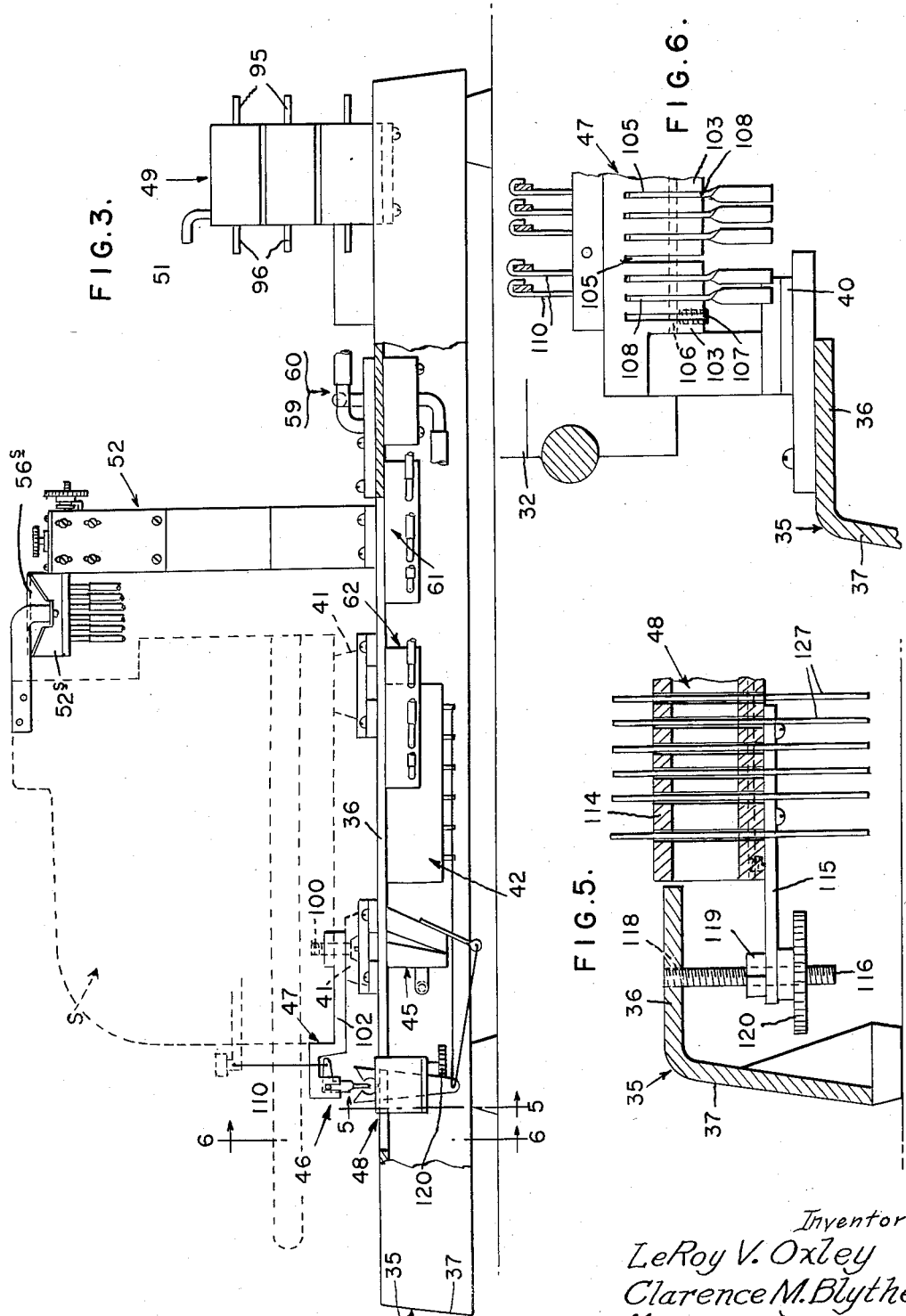

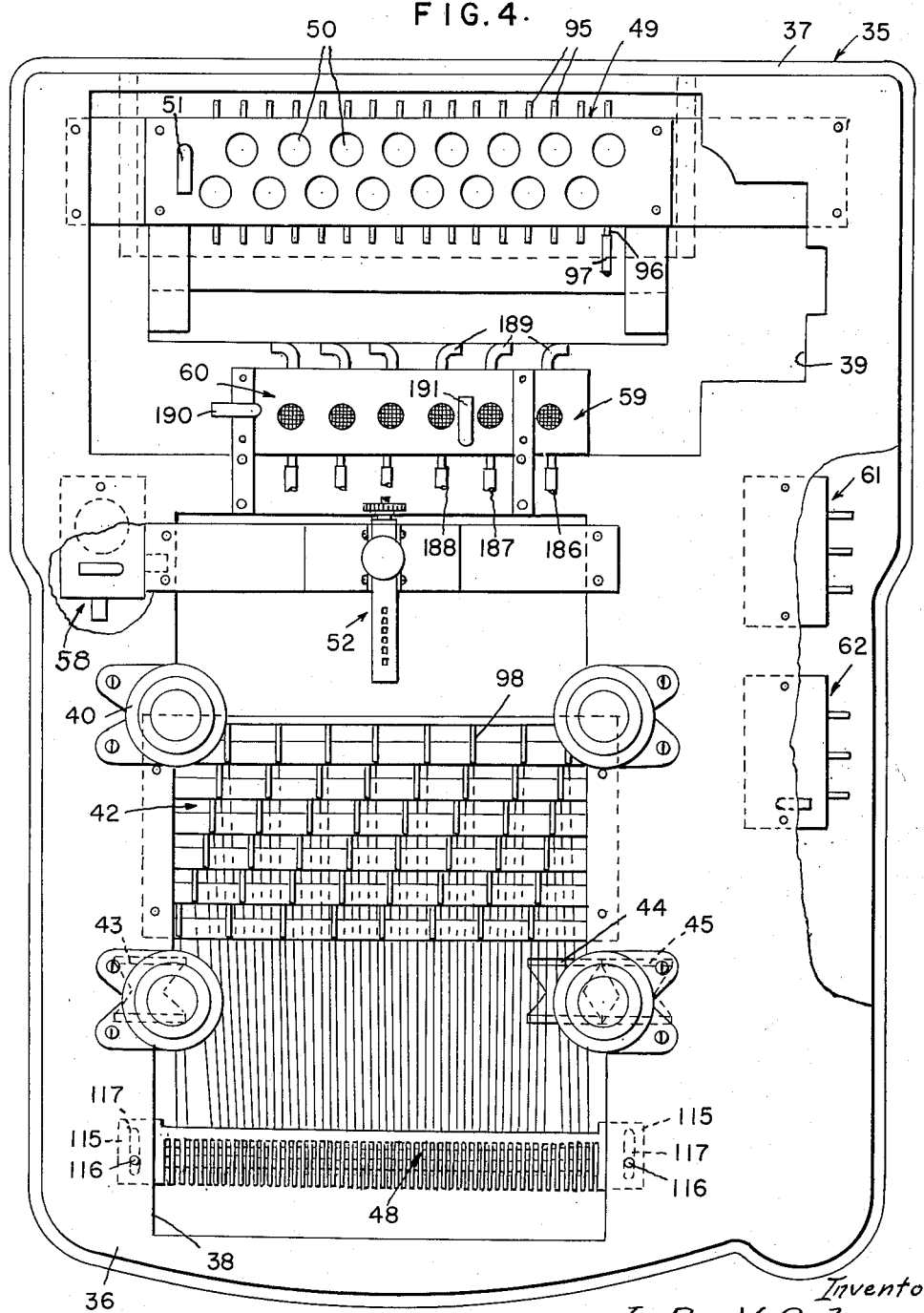

Jan. 10, 1961  LE ROY V. OXLEY ET AL  2,967,600
MASTER AND SLAVE CONTROL TYPING SYSTEM
AND STRUCTURAL UNITS FOR USE THEREIN
Filed May 24, 1955  9 Sheets-Sheet 7

Inventors
LeRoy V. Oxley
Clarence M. Blythe.
By Shoemaker & Mattare
ATTYS

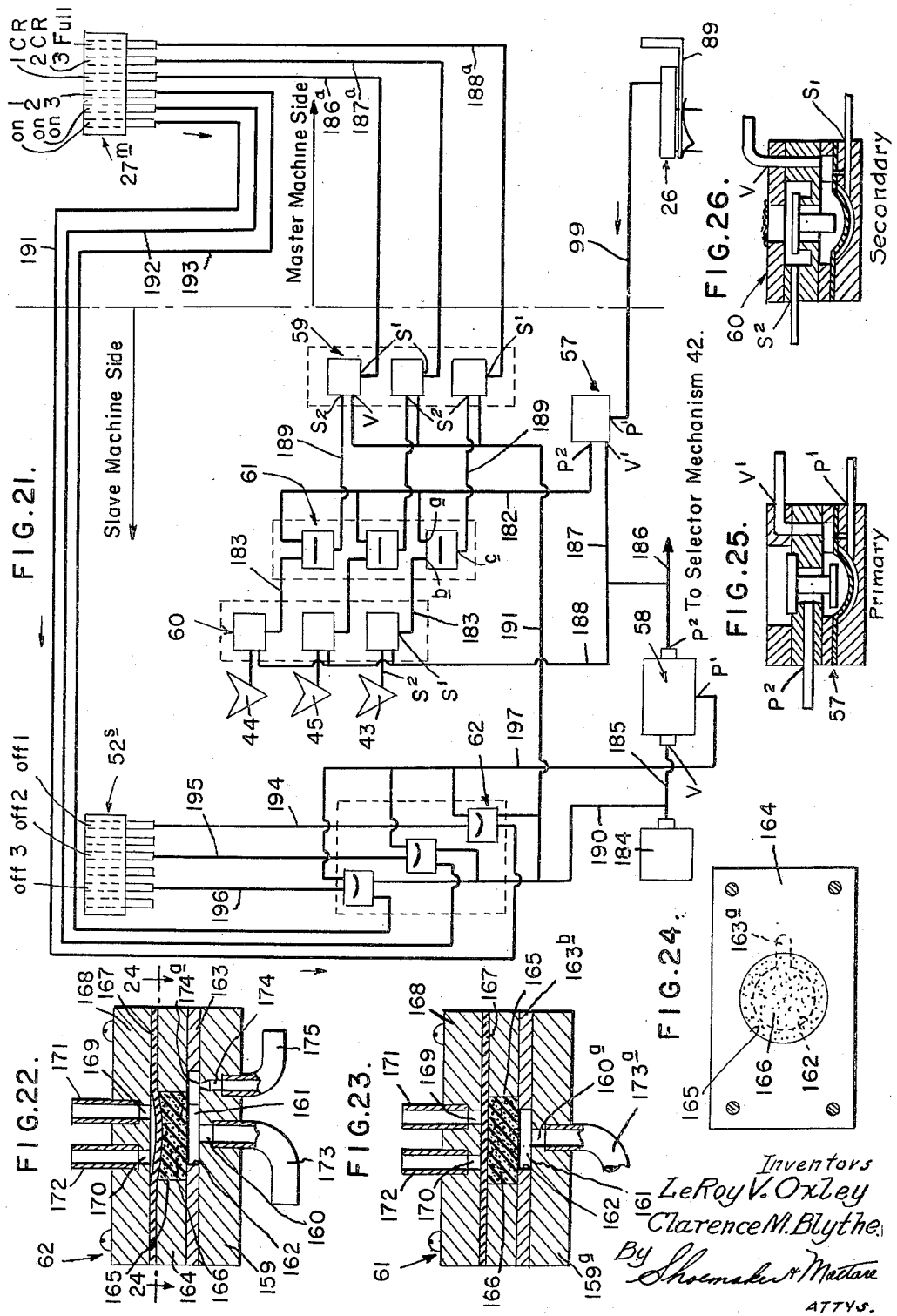

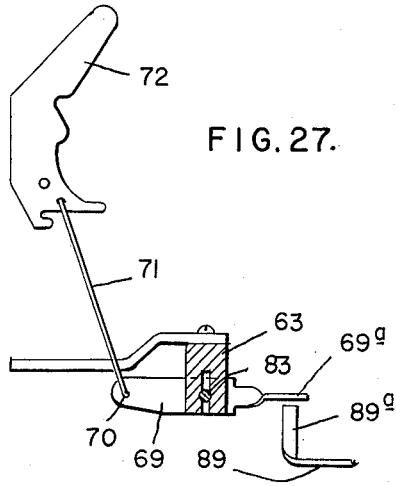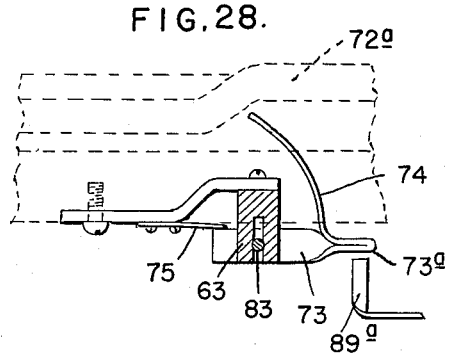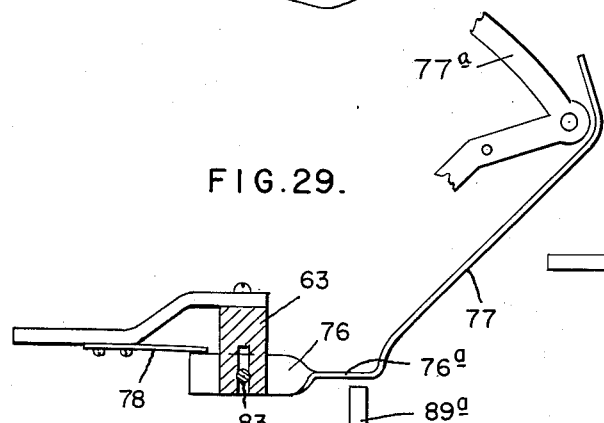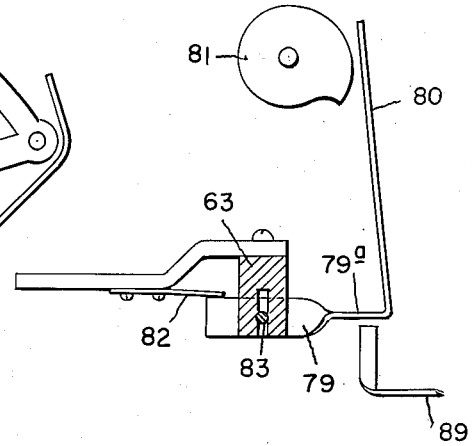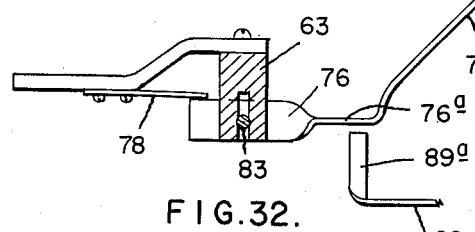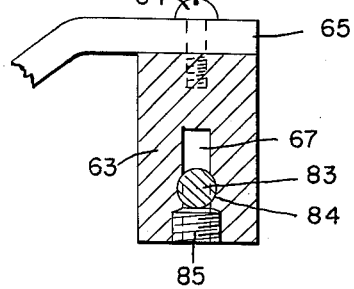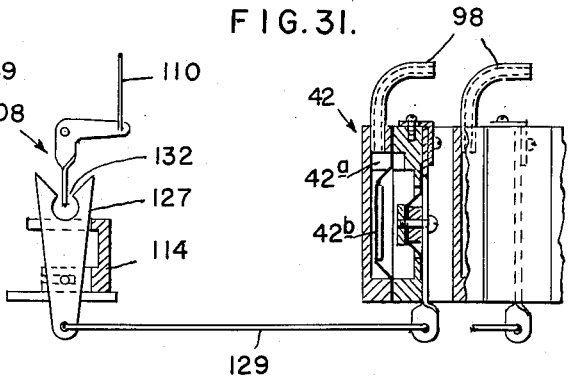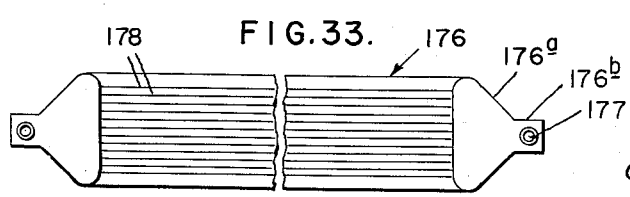

United States Patent Office 2,967,600
Patented Jan. 10, 1961

2,967,600

MASTER AND SLAVE CONTROL TYPING SYSTEM AND STRUCTURAL UNITS FOR USE THEREIN

Le Roy V. Oxley and Clarence M. Blythe, Hendersonville, N.C., assignors to Robotyper Corporation, Hendersonville, N.C., a corporation of Michigan Filed May 24, 1955, Ser. No. 510,791

33 Claims. (Cl. 197—5)

This invention relates broadly to a system of typing and to certain new and novel structural units for use therein.

The present invention is particularly well suited for use by trucking companies and freight forwarding companies where freight bills and manifest sheets are prepared and wherein portions only of the freight bill are typed up on the manifest and it is a particular object of the present invention to provide a new and novel typing system wherein there are associated a master typewriter machine and a slave typewriter machine with mechanism operatively coupling the machines together whereby predeterminately selected data typed upon the master machine will be automatically transmitted to and typed by the second or slave machine.

The invention is not limited to use by trucking and freight forwarding companies, however, but may be employed in any capacity where it may be desired to prepare two or more sheets of typed material and wherein one sheet is to receive a portion only of the material typed on the other sheet.

A further object of the invention is to provide in a mechanism for performing the above stated operation, a novel control or program tape with means for attaching the same to the typewriter carriage whereby such tape will be moved with and by the carriage in cooperation with an associate element of the system to effect the desired action of certain elements of the system.

In the operation of the typing system in accordance with the present invention, both the master and slave machines have the carriages thereof equipped with a control or program tape and such tapes function in cooperation one with the other to effect the actuation of elements of the system in a predetermined sequence whereby simultaneous return movements of the carriages of the machines may be effected or the slave machine may be operatively disassociated from the master machine for a predetermined time during which typing operations on the master machine may be continued for a desired period without affecting the slave machine and the slave machine then may be operatively reassociated with the master machine so that simultaneous typing operations can be carried out upon the two.

The invention of the present application is designed for use in association with electrically operated mechanical typewriting machines although it may be applied to non-electrically operated machines and is designed to effect the actuation of the slave machine by pneumatic actuating mechanism such, for example, as that disclosed in Patent No. 2,327,172 of August 17, 1943, wherein there is disclosed a pneumatic means for effecting the actuation of typewriter keys under the control of a perforated tape or ribbon passing over a tracker bar. In such machine, and others of similar construction, the linkage mechanism between the typewriter keys and the pneumatic operators therefor is such that separation of the typewriter machine from the pneumatic control mechanism, or the coupling of such mechanism and the machine together, cannot be effected without a considerable amount of work. Accordingly it is another object of the present invention to provide a new and novel harness mechanism consisting of two parts or sections one of which is permanently secured to the underside of the typewriter while the other part is permanently coupled with the pneumatic actuating mechanism in a supporting base, wherein the two parts of the harness are designed in a novel manner so as to be readily operatively coupled together, or uncoupled, by placing the typewriter on the base or lifting it therefrom, thereby permitting ready removal and use of the typewriter separate and apart from the pneumatic operating mechanism.

Still another object of the present invention is to provide in a pneumatic typewriter operating system employing operatively coupled master and slave machines in accordance with the present invention, a new and novel mechanism associated with the master machine and a supporting base structure therefor by means of which, upon the actuation of the keys of the master machine, air impulses will be transmitted to the key actuating pneumatic key selector mechanism of the slave machine for effecting a typing action of the latter duplicating the typing of the master machine.

Still another object of the invention is to provide a new and novel control system between a master typewriter machine and a slave typewriter machine for performing the several functions hereinbefore set forth, which is vacuum or pneumatically operated and wherein the performance of the desired functions is effected by means of a perforated program control tape connected to and movable with each typewriter carriage and sliding or moving over a vacuum sensing head.

Still another object of the invention is to provide a novel mounting for the vacuum sensing head over which each of the perforated control tapes moves, whereby such head may be readily shifted or adjusted either vertically or horizontally for properly positioning it for desired registration of apertures therein with apertures of the overlying tape.

The vacuum or pneumatically actuated system of the present invention embodies a number of valves of different types one of which, when closed, functions to block the passage of an air impulse between certain other valves and it is a further object of the present invention to provide a new and novel form of such blocking valve incorporating a novel means for effecting rapid closing of the same when vacuum action functioning to keep it open is interrupted.

Other objects and advantages of the invention will become apparent as the description of the same proceeds and the invention will be best understood from a consideration of the following detailed description taken in connection with the accompanying drawings forming part of the specification with the understanding, however, that various changes and modifications may be made so long as such changes or modifications mark no material departure from the invention as defined by the appended claims.

In the drawings:

Fig. 1 is a view illustrating in perspective a master typewriter machine and a slave typewriter machine operatively coupled together in accordance with the present invention and illustrating in connection with each machine the program selector tape and mounting for the same on the machine carriage.

Fig. 2 is a view illustrating in side elevation the supporting base for the master typewriter machine showing elements of the present invention mounted thereon, particularly the program tape sensing head unit and supporting means therefor and the impulse plate in operative relation with the valve actuators mounted upon the underside of the typewriter, the typewriter being generally indicated in dotted outline.

Fig. 3 is a view illustrating partly in side elevation and partly in longitudinal section the supporting base for the slave typewriter machine showing in elevation the slave machine harness mechanism together with the program tape sensing head unit and supporting bracket and other elements of the system, the slave typewriter machine being indicated in broken outline.

Fig. 4 is a view in top plan of the supporting base for the slave typewriter machine showing mounted thereon certain elements of the pneumatic actuating mechanism, illustrated in the prior patent hereinbefore referred to, together with elements of the control system of the present invention.

Fig. 5 is a detail section taken substantially on the line 5—5 of Fig. 3 showing in elevation a portion of the lower unit of the slave harness mechanism and the mounting means therefor.

Fig. 6 is a sectional view taken substantially on the line 6—6 of Fig. 3 illustrating in elevation a portion of the upper unit of the slave harness mechanism.

Fig. 7 is a view of the underside of the top unit of the slave harness showing the mounting of the same on the underside of the slave typewriter.

Fig. 12 is a view in elevation from the rear of the top unit of the slave harness, a portion of the central part being broken out.

Fig. 13 is a view in elevation of the full bottom unit of the slave harness showing portions of the forked or bifurcated levers in section.

Fig. 14 illustrates the connection between a bell crank of the top unit of the slave harness and the lever of a partial carriage return key.

Fig. 15 illustrates the connection between a bell crank of the top unit of the slave harness and the lever of the full carriage return key.

Fig. 16 is a view in elevation, on an enlarged scale, of a sensing head and the mounting therefor whereby it may be both vertically and horizontally adjusted.

Fig. 17 is a sectional view taken substantially on the line 17—17 of Fig. 16.

Fig. 18 is a view in rear elevation of a sensing head and supporting frame or bracket therefor showing the disposition of a program tape across the top of the head.

Fig. 19 is a sectional view taken substantially on the line 19—19 of Fig. 12.

Fig. 20 is a sectional view taken substantially on the line 20—20 of Fig. 13.

Fig. 21 is a flow diagram of the control system between the master and slave typewriters.

Fig. 22 is a sectional view through the novel blocking valve having a vacuum bleed connection.

Fig. 23 is a sectional view through a blocking valve without the vacuum bleed.

Fig. 24 is a sectional view taken substantially on the line 24—24 of Fig. 22.

Fig. 25 is a sectional view taken transversely in a vertical plane through a primary valve.

Fig. 26 is a sectional view taken transversely in a vertical plane through a secondary valve.

Fig. 27 is a detail illustrating the connection between a master machine harness lever and a bell crank of the typewriter.

Fig. 28 is a detail view showing a modified form of the master machine harness lever adapting it for operation by the carriage return lever.

Fig. 29 is a detail illustrating another modified form of the master machine harness lever adapting it for actuation by the typewriter tabulator key lever.

Fig. 30 is a detail view illustrating a modified form of the master machine harness lever adapting it for actuation by the typewriter back spacer.

Fig. 31 is a detail view illustrating the connection between one of the diaphragm actuated units of the pneumatic selector mechanism and a rock lever of the lower unit of the slave machine harness.

Fig. 32 is a detail section, on an enlarged scale, taken approximately on the line 32—32 of Fig. 8.

Fig. 33 is a view in plan of a program control tape in which are formed at desired or predetermined locations apertures for coaction with the vacuum ports of a sensing head.

Fig. 34 is a view illustrating a portion of a bill, such as a freight bill, prepared on the master typewriter machine and, Fig. 35 is a view illustrating a portion of a manifest sheet illustrating the parts of the freight bill typed thereon by the operation of the control system connecting the master and slave typewriters together.

Figure 8:
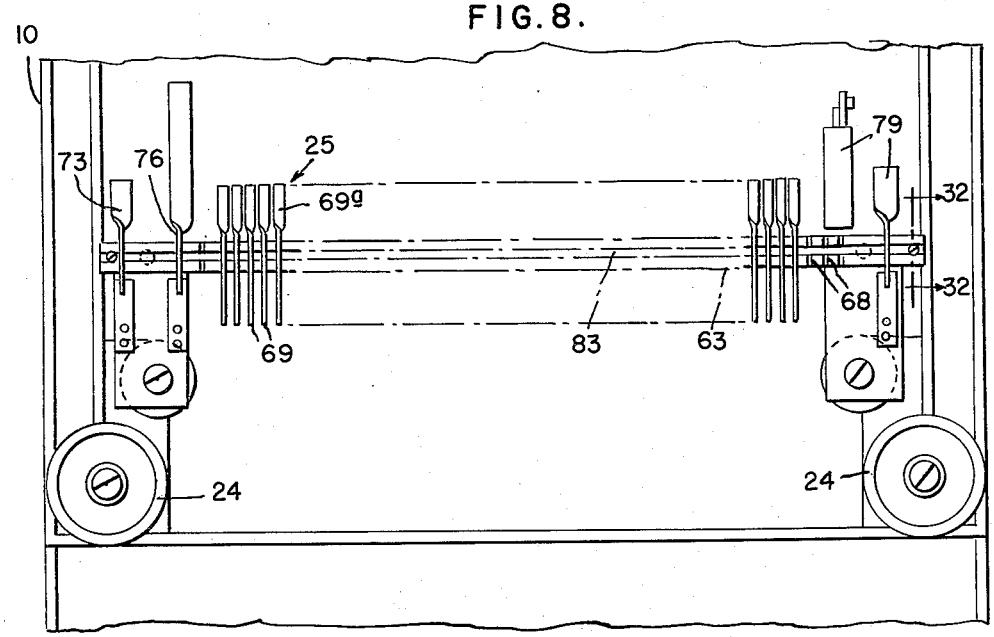
Fig. 8 is a view of the underside of the master harness mechanism top unit showing the mounting of the same upon the underside of the typewriter, a portion of the frame of which is illustrated.

Referring now more particularly to the drawings, a more or less general description or reference will first be made to the units making up the general system.

In Fig. 1, the reference character M generally designates the master typewriter machine and the elements of the invention associated therewith, while the reference character S generally designates the slave typewriter machine together with elements of the invention associated with it. These machines are preferably of the mechanical type, that is, they are electrically operated and each machine may be of any one of a number of well known commercial electric typewriters and since the typewriters per se form no part of the present invention and all of the details of construction and manner of operation of the same are well known to those versed in the art, no detailed description of the electrical typewriter mechanism for either machine is considered necessary to a proper understanding of the present invention and none is therefore given.

Referring now generally to the master machine M, the numeral 10 generally designates the machine frame or casing in the front part of which is the conventional keyboard 12, while the numeral 14 generally designates the machine carriage.

The numeral 16 generally designates a conventional type of base upon which the machine is mounted, such base being of hollow construction having the top plate 18 and downturned encircling flange or skirt 20, the top plate 18 being provided at proper positions with cups 22 in which the conventional rubber feet 24 of the typewriter rest. The typewriter is thus maintained at a slight elevation above the base plate 18 and in this space there is positioned across the underside of the master typewriter a key harness which is generally designated 25 and an impulse plate cooperating with the harness and generally designated 26, the harness and plate being hereinafter more specifically described.

Mounted upon the base 16 at the back of the typewriter is a sensing head unit which is generally designated 27, the details of which will be hereinafter more fully set forth.

Mounted on each end of the carriage 14 by means of existing screws 28 is a rearwardly extending resilient arm 29 having a down-turned extension 29a terminating in the reduced finger 30. These arms are of resilient character and support and have stretched between them a perforated program control tape generally designated 31m the details and function of which will be hereinafter set forth.

The slave machine S includes the typewriter casing 32 housing the electrically operated typing mechanism and having at the front the conventional keyboard unit 33.

The numeral 34 generally designates the slave machine carriage.

The numeral 35 generally designates a conventional base for the slave machine which, like the base 16 of the master machine, comprises a top plate 36 and a depending flange or skirt 37 so that such base provides a hollow structure within the confines of the skirt 37 of which certain units for operating the slave machine are located.

The plate 36 forming the top of the base is provided with two rectangular openings 38 and 39 to facilitate the extension upwardly of coupling elements between the units secured on the underside of the top or plate and key bars of the typewriter mounted on the base.

At opposite sides of the front opening 38 there are secured to the top of the plate 36 the conventional cups 40 properly spaced and located to receive the conventional rubber feet 41 of the typewriter machine.

The slave typewriter machine S has the various typing keys and other control keys and levers actuated by impulses transmitted from the master machine from the impulse plate unit 26 to a pneumatic selector mechanism which is generally designated 42 and bellows units 43, 44 and 45.

The selector mechanism generally designated 42, is of known construction and may be of the character disclosed in Patent 2,198,860 or Patent 2,327,172 and, accordingly, no detailed description of the construction or illustration thereof is given or believed necessary other than the detailed illustration in Fig. 31 to show an operative connection between one of the diaphragms and a forked or bifurcated lever of the hereinafter described slave harness bottom unit.

Located beneath the keyboard of the slave typewriter machine is the new harness unit by which the pneumatic selector mechanism and the operating bellows are operatively coupled with the type and control keys of the typewriter, such harness being generally designated 46 and comprising the upper or top unit 47 and the lower or bottom unit 48. These units, together with the manner in which they are coupled together for cooperative action will be hereinafter more specifically described.

Associated with the impulse unit and the pneumatic selector unit in the operation of the slave machine and interposed between such unit and mechanism is a battery of valves which is generally designated 49 which, as shown in Figs. 3 and 4, is mounted upon the top of the base at the rear thereof.

The individual valves of this battery 49 are of known form or design, being termed primary valves and each of the valves of this battery is designated 50, one of such valves being illustrated in detail in Fig. 25 and one only of such valves is illustrated in the diagram forming Fig. 21, for reasons of clarity.

The battery of primary valves is divided into three units stacked one upon the other and each unit consisting of sixteen valves, there being one valve for each of the individual valves of the pneumatic selector mechanism and for each of the hereinafter described impulse control fingers of the impulse plate or unit 26. These individual valves 50 function in the pneumatic lines connecting the impulse plate unit 26 with the pneumatic actuator mechanism as impulse boosters, the primary valves 50 being under vacuum influence applied to the vacuum pipe nipple 51.

Mounted upon the base 35 at the rear of the slave machine is the sensing head unit which is generally designated 52 and which is of the same construction and mounted in the same manner, as hereinafter described in detail, as the unit 27 hereinbefore described.

The slave machine carriage 34, like the carriage 14, has secured to each end thereof by means of existing screws 53, preferably, or by any other suitable means, a rearwardly extending resilient arm 54 which has a downturned rear end portion 54a which terminates in the finger 55. These arms 54 have supported between them a program control tape 56s for coaction with the sensing head forming a part of the unit 52 as hereinafter more fully described.

In Fig. 1, the reference character T generally designates as a group the pneumatic tubes connecting together the units of the master and slave machines, such tubes being illustrated as enclosed in a suitable sheath a portion of which has been shown as broken away.

Fig. 21 illustrates diagrammatically the pneumatic system which is directly controlled by the program tapes 31m and 56s which cooperate with the sensing head units 27 and 52 respectively.

In this flow diagram forming Fig. 21, a number of control valves are illustrated, certain of which are individual valves while others are arranged in groups or banks, and all of such valves are mounted in the several positions illustrated in Fig. 4 upon the underside of the top plate 36 of the slave typewriter base 35.

In Fig. 21, the numeral 57 is employed to designate a particular one of primary valves of the bank 49 shown in Fig. 4, which valve 57 will be further specifically identified as a first primary valve, the numeral 58 designating another primary valve, more specifically identified as the second primary valve, the latter also being shown in the diagram of Fig. 21. As hereinbefore stated, the primary valves of the present system are, in their general construction and operation, of known character but, to facilitate the understanding of the operation of the system and of these valves therein, an illustration of one of such valves is given in Fig. 25.

The numeral 59 generally designates a group of three secondary valves which are directly connected with the sensing head unit 27 of the master machine, while the numeral 60 generally designates a second group of such secondary valves, each of which is operatively coupled with a carriage return bellows and interposed between this first group 59 and the second group 60 of the secondary valves is a group or bank of normally closed blocking valves, generally designated 61.

These secondary valves are also of known construction and operation and one thereof is shown in section in Fig. 26 to facilitate an understanding of the operation of the valves in the system.

Associated with the sensing head unit of the slave machine is a second group of blocking valves, hereinafter described in detail, each of which is generally designated 62.

The blocking valves 61 and 62 are of novel construction and are illustrated in detail in Figs. 22, 23 and 24.

Detailed descriptions will now be given of the several units hereinbefore generally referred to and identified, followed by a description of the operation of the control system.

*Master key harness*

Referring particularly to Figs. 2, 8 and 27 it will be seen that the key harness 25 is mounted upon the underside of the master typewriter and comprises a bar 63 which is secured at each end in a suitable manner as, for example, by means of screws 64 to an end of a mounting plate 65 which, in turn, has its other end secured by a screw 66 engaged in an existing screw hole in the underside of the typewriter frame. The bar 63 thus extends transversely of the underside of the typewriter beneath the key elements by which the type bars and other elements of the machine are actuated.

The bar 63 has formed longitudinally therein the downwardly opening slot 67. Also formed in the bar 63 transversely thereof are the downwardly opening slots 68 which are in relatively closely spaced relation and extend throughout the major portion of the length of the bar for the purpose about to be described. The number of these transverse slots 68 is equal to the number of keys on the typewriter keyboard and for each of the typewriter keys which is provided to actuate a type bar there is provided a straight key lever 69 which is positioned transversely of the bar 63 and disposed in one of the transverse slots 68.

Each of the key levers 69 is provided at one end with an aperture 70 in which is engaged one end of an actuating wire or rod 71, the other end of which wire or rod is operatively connected with the typewriter key bell crank 72 whereby, upon the operation of the type key which causes oscillation of the bell crank 72, an upward pull will be applied to the wire or rod 71 to oscillate the lever attached thereto.

The opposite rearwardly extending end of each of the levers 69 is formed to provide the flattened terminus 69a for contact with the hereinafter described impulse plate finger over which it positions.

In addition to the type key actuated levers 69, certain of the other transverse slots 68 have located therein modified levers to be engaged and actuated by adjacent manually actuated parts of the typewriter keyboard. For example, beneath the typewriter return lever 72a, the harness bar supported lever 73 has the flattened rearwardly extending terminus 73a thereof joined to an upwardly extending arm 74 which terminates beneath the typewriter return lever 72a so that upon depression of the latter lever, the lever 73 will be depressed. This lever 73 is maintained in the desired horizontal position by means of a small leaf spring 75 attached to the adjacent plate as shown in Fig. 28 and engaged at one end with the top of the lever 73 to yieldingly resist downwardly swinging of the portion 73a which actuates the hereinafter described impulse plate fingers.

According to the make of typewriter upon which the master key harness is mounted, other modified forms of the levers 69 will be supported in appropriate slots 68, for actuation by the various control keys, such as the tabulator key, back space lever and the like.

In Fig. 29, for example, the lever 76 is provided which corresponds to a lever 69 and lies in one of the slots 68 and has the flattened portion 76a thereof extended to the necessary extent, forming the relatively stiff finger 77 which is located for engagement by the desired key lever of the typewriter, such as that designated 77a. This lever 76 is also spring biased as indicated at 78 to maintain the portion 77 thereof in proper position for engagement by the overlying typewriter part and the portion 76a is located over a finger of the impulse bar, hereinafter described, for engagement with the latter upon actuation of the typewriter key.

Another form of lever, corresponding to levers 69, is shown in Fig. 30 where the lever 79, disposed in one of the transverse slots 69, as shown, has the rearwardly extending impulse plate finger engaging portion 79a provided with the upwardly extending finger 80 which is located to be engaged by an actuating cam 81 of the typewriter which may, for example, represent the back spacer operator. This lever 79 is also spring biased as indicated at 82 to maintain it in proper horizontal position with the extension 80 in proper position for engagement by the cam when it is desired to operate the back spacer.

The several lever forms are merely illustrative of different ways of transmitting action from the key bars to impulse plate fingers.

All of the lever elements which are disposed in the transverse slots 68 of the bar 63 are supported for rocking movement by an elongate hinge pin 83 which is extended longitudinally of and in the longitudinal slot 67, being engaged at opposite sides in slight side depressions in the walls of the slot as indicated at 84 in Fig. 32 and this pivot pin is preferably maintained in position by a suitable set screw 85 which is threaded downwardly in the longitudinal slot 67 against the pin 83, the opposite sides of the set screw having the threads thereof engaging in suitable threads formed in the opposite faces or surfaces of the slot 67.

While certain specific forms have been shown for the extensions on the levers 73, 76 and 79, it will be understood that since the device under consideration is designed to be applied to any one of a number of different makes of electrically operated typewriters, these parts may be changed or modified to properly adapt them to the type machine to which the harness is secured.

*Impulse plate*

Figure 9:
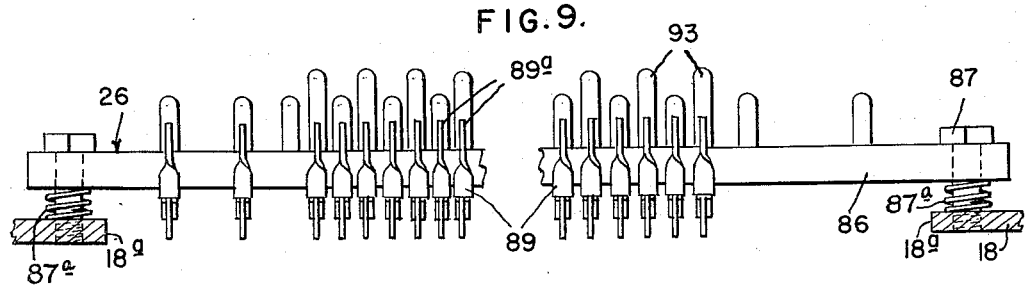
Fig. 9 is a view looking at the front of the impulse plate unit which forms the lower part of the master harness mechanism.

The impulse plate unit 26 is mounted upon the top of the master typewriter machine base 16, as previously stated, slightly rearwardly of the harness unit 25 as illustrated in Fig. 2. This impulse plate unit comprises the elongate, relatively wide plate body 86 which is disposed across the opening 18a which is formed in the plate 18 of the base 16, as shown in Fig. 9. Machine screws 87 couple the impulse plate 86 to the plate 18 and to facilitate adjusting the impulse plate to compensate for lowering of the typewriter due to foot compression, coil supporting springs 87a may be interposed between the plate 18 and the impulse plate as shown.

Figure 10:
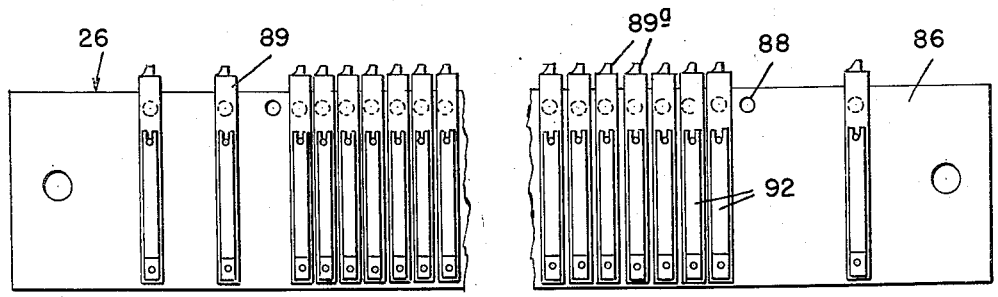
Fig. 10 is a bottom plan view of the impulse plate unit.
Figure 11:
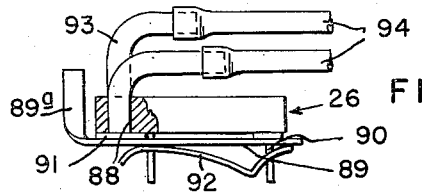
Fig. 11 is a view in end elevation of the impulse plate unit with a portion broken away and in section showing a valve covering an air admission port.

The plate body is provided with a longitudinally extending row of apertures 88 which extend therethrough as shown in Fig. 10, which apertures equal or exceed in number the number of levers pivotally supported upon the key harness bar 63.

Disposed across the underside of the plate body 86 is a plurality of flat, relatively thin valve elements or valve strips 89, each of which is suitably rockably held as indicated at 90 whereby it may be swung downwardly away from the overlying face of the plate body 86, each of which valve elements 89 extends across an opening 88 beyond the forward side of the plate body 86 and terminates in the upwardly extending finger portion 89a which terminates beneath and is adapted to be engaged by the flattened forwardly extending portion of a key lever whereby, upon the rocking of the key lever, downward pressure will be applied to the upwardly directed end of the finger 89a to flex the valve element away from the opening 88 which it covers.

Each of the valve elements is provided with a pad 91 which is pressed against the underside of the plate body and covers the opening 88 thereabove.

Each valve element has its rear end portion provided with a suitable aperture to loosely receive a position retaining pin 90, and is subjected to constant spring biasing by a leaf spring 92 which is engaged at its back end of the pin 90 and has its other end bearing against the underside of the valve element to constantly yieldingly urge the element upwardly to press the pad 91 against the plate body.

Each of the openings 88 has connected therein one end of a nipple 93 with which is connected an end of an air conducting tube 94, the other end of which tube is connected to a nipple 95 of one of the primary valves 50 in the block 49 shown in Fig. 4.

The nipples 95 of the primary valves 50 communicate with the pocket of the valve beneath the leather or diaphragm which, in such valve, is in normally depressed condition, while the opposite nipple 96 is in communication with the chamber above the valve leather. Certain of these nipples 96 are connected by tubes 97 with nipples 98 of the individual units of the pneumatic selector mechanism such, for example, as one of the units illustrated in Fig. 31, which unit structure is of known character, as hereinbefore stated.

Each of the units of the pneumatic selector mechanism 42 is operatively coupled, in a manner hereinafter described, through the medium of the hereinafter described slave harness, with a key of the slave typewriter machine so that when an impulse is transmitted from the impulse plate 26 by the depression of one of the valve elements 89, the unit of the selector mechanism connected with the opening 88 which has been uncovered will be actuated in known manner to operate the desired slave typewriter key.

As hereinbefore described, certain of the levers rockably mounted on the pivot rod 83 of the master machine harness have those ends which are located to engage the finger terminus 89a of a valve element of the impulse plate, of special form for engagement and movement by those elements of the master machine which effect the carriage return, back spacing and tabulator movement of the carriage.

The master machine harness levers 76 and 79 actuate valve elements 89 of the impulse plate 26 to open or transmit impulses through the air lines leading to the pneumatic selector mechanism units which function through the slave machine harness to actuate the back spacer and tabulator keys in known manner.

The keys of the master machine which are employed for effecting the full carriage return or either of two stages of partial carriage return, operate master harness levers such as that shown in Fig. 28 and designated 73, to open ports 88 in the impulse plate communicating with one air line or air impulse tube 99 leading to the primary valve 57 to effect desired carriage return of the slave machine, in the manner described hereinafter.

Slave machine harness—Top unit

The top unit 47 of the slave machine harness which is designated as a whole by the reference numeral 46, is, as hereinbefore stated and as shown in Fig. 3, secured to the underside of the slave machine at the front part thereof in a suitable manner, preferably by the employment of the conventional screws 100 by means of which the front feet 41 of the slave machine are secured in position.

The unit 47 comprises a flat bar 101 of a length to span the width of the typewriter machine and having at each end a suitable angular extension 102 to facilitate the mounting of the bar directly beneath the keyboard as shown in Fig. 3 by the employment of the machine feet securing screws 100. The angular extension 102 is here shown as terminating in an apertured plate or ear 103 which positions against the underside of the typewriter frame and has the foot securing screw 100 passed therethrough.

It will, of course, be understood that this construction of the bar 101 may be changed or varied to suit the particular type of typewriter to which the harness is to be attached.

The bar 101 is provided on the under or downwardly directed side with the longitudinally extending rib portion 103 which, like the bar 63 of the master machine harness, is provided with the downwardly opening longitudinal slot 104 and with the relatively closely spaced transverse slots 105.

Extending lengthwise of the longitudinal slot 104 is a pivot rod 106 which engages at opposite sides in recesses formed in the opposing faces or walls of the slot and this pivot rod is maintained securely in position in a suitable manner, preferably by the use of a set screw 107, as illustrated and described in connection with the means for securing the pivot rod 83 in the master harness bar.

The transverse slots 105 are designed to receive the angle portion of a bell crank lever 108. Each of the type keys of the slave machine has one of these bell crank levers located therebeneath, particularly one end of the leg, designated 109, which is normally substantially horizontally disposed and is connected by a pull wire or rod 110 with the overlying key whereby upon the rocking of the lever in the proper direction to swing the leg 109 downwardly, the attached key will be actuated to fire the type bar.

The other operating key levers of the slave machine are likewise connected with a bell crank lever as, for example, the partical carriage return key 111 shown in Fig. 14 and the full carriage return key 112 as shown in Fig. 15.

The numeral 113 designates the other one of the two right-angularly related legs of a bell crank 108. This leg 113 extends downwardly and has flat side faces directed forwardly and rearwardly with respect to the typewriter structure for coaction with the slave harness lower or bottom unit 48.

Slave harness—Lower unit

The lower or bottom unit 48 of the slave harness comprises the bar 114 which spans the forward portion of the opening 38 in the top plate 36 of the base 35 upon which the slave machine is mounted. This bar is attached at its ends to the top plate 36 of the slave machine by means of a plate 115 secured to the bottom face of the bar at each end and the threaded bolt 116 which passes through a slot 117 in each of the plates.

As shown in Fig. 5, a portion of the mounting plate 115 at the end of the bar 114 extends beneath the top 36 of the base 35 and an end of the screw or bolt 116 is threadably engaged in an opening or aperture 118 formed in the top plate 36 of the base.

Threaded on the bolt 116 above each plate 115 is a positioning nut 119 and threaded on the bolt 116 for engagement against the underside of the plate 115 is a wheel nut 120 which raises the plate and the end of the bar to the desired elevation as controlled by the positioning nut 119 where it secures the bar.

The slot 117 in each of the mounting plates 115 extends in the direction of the length of the base 35, that is, from front to rear, and facilitates the front to rear adjustment of the bar 114 as will be readily obvious. Thus, the bar can be adjusted for height with respect to the base and forwardly and rearwardly to bring it to the best position for the coaction of the hereinafter described rock levers which it carries with the overlying bell crank levers.

As illustrated in Fig. 20 the bar 114 may be of relatively thin flat form and when mounted in position upon the base 35 is positioned on edge with the flat faces vertical and formed along the top edge upon the rearwardly directed side or face of the bar is a guide flange 121 and below this flange, a second flange, designated 122, is formed along the bottom edge of the plate and projecting rearwardly therefrom.

The top flange 121 is provided with a plurality of rearwardly opening slots 123 corresponding in number with the slots 105 of the top unit flange or rib 103.

The rib or flange 122 is, like the rib 103, provided with the longitudinally extending, rearwardly opening slot 124 and with the transverse slots 125, each of which is in line with or the vertical plane of the overlying slot 123.

Extending longitudinally of and within the longitudinal slot 124 is the pivot rod 126 which, like the pivot rods hereinbefore described, engages in recesses formed in opposing faces of the walls of the slot 124 and may be secured by a set screw or any other suitable means as hereinbefore described.

Lying within each of the slots 125 and mounted for rocking movement on the pivot rod 126 is a rock lever 127. This rock lever is in the form of an elongate, flat plate which is preferably of tapering width from its upper to its lower end as shown in Fig. 20 and the upper end portion of the rock lever lies in a guide slot 123 and projects a substantial distance above the flange 121.

The tapered lower end of the rock lever extends a substantial distance below the bar 114 and is provided with a number of apertures 128 disposed in a line extending longitudinally of the center of the lever and with one of which is connected an end of a pull rod or wire 129.

The upper end of each rock lever 127 has a V notch 130 formed therein and below this notch is formed an aperture 131, the edge of which cuts across the bottom of the notch 130 forming the opening 132 and the opposing points 133.

As illustrated in Figs. 3 and 31, the two units 47 and 48 are designed to be interconnected and when so associated, the flattened end of each of the bell crank levers 108 positions in the space or opening 132 between the points 133 of a rock lever and when an air impulse is introduced into the air line leading from the impulse plate of the master machine to the individual diaphragm chamber 42a of an actuator 42b, forming a part of the pneumatic selector mechanism, and operatively coupled with the rock lever by the link or pull wire 129 as shown in Fig. 31, the rock lever will be oscillated to effect corresponding oscillation of the bell crank 108 associated therewith. This will impose a downward pull on the coupling wire 110 leading to an overlying key of the slave machine.

From the foregoing description of the master harness and the manner in which it is associated with the impulse plate, and of the slave unit harness made up of the upper and lower units, it will be readily apparent that after the harness 25 and the impulse plate of the master machine have been set or secured respectively in operating position and after the upper and lower units 47 and 48 of the slave machine harness 46 have been set or fixed respectively to the typewriter machine and its supporting base, the typewriters can be removed and replaced at will without the necessity of having to make any adjustments or do any work to effect the operative coupling together of the parts.

The system of the present invention by which desired or predetermined portions of material typed on the master machine are caused to be typed by the slave machine and carriage actuation of the slave machine is effected automatically, is shown diagrammatically in Fig. 21 and the operation of the system is controlled by the perforated tapes each carried by and moving with a machine carriage and each in such movements sliding on and over a ported or apertured sensing head. The sensing head forming a part of the unit 27 of the master machine is designated 27m and the sensing head forming a part of the unit 52 of the slave machine is designated 52s.

The units 27 and 52 are of identical construction and, accordingly, a description of one suffices for both and, except for the identification of the heads by the reference characters 27m and 52s, to maintain a definiteness as to which is being referred to in describing the operation of the system, the same reference characters will be employed for the parts of the two units.

*Sensing head unit*

Referring now particularly to Figs. 16, 17 and 18, it will be seen that the sensing head unit comprises an upright frame which is generally designated 134 and comprises spaced upright legs 135 which, at their lower ends, are relatively widely spaced apart but have terminal upper end portions 135a positioned in relatively closely spaced parallel relation in which they may be held in a suitable manner as by means of pins, screws or bolts 136 passing transversely therethrough and through suitable spacers 137.

Disposed between the upper end portions of the closely spaced parallel portions 135a of the frame legs is a guide generally designated 138 for the sensing head, here designated in Figs. 16, 17 and 18 by the reference character 27m but which, as hereinbefore stated, is of identical form or construction as the head 52s forming a part of the unit 52 associated with the slave machine.

The sensing head is supported upon an arm 138a, and formed vertically through the head and through the portion of the arm upon which the head rests are a number of vacuum passages 139 each of which opens as a suction port 140 through the top surface of the head while the lower end of each passage has fixed therein a nipple 141 for the attachment of an air line thereto as hereinafter set forth.

As illustrated, the sensing head 27m or 52s is in the form of an elongate block through which the passages 139 are extended vertically and the arm 138a has a substantial portion of one end extending beyond an end of the sensing head and into the guide 138.

The sensing head unit is mounted on the typewriter base, either the base 16 or the base 35, with the head between the top end of the frame and the rear of the typewriter so that the program control tape carried by the typewriter carriage will be disposed across the ported top side of the sensing head as is clearly shown in Figs. 2 and 3.

The end of the sensing head arm 138a remote from the head carries the longitudinally extending screw 142, the function of which is hereinafter described.

The guide 138 through which the free end portion of the arm 138a extends is mounted between the upper end portions 135a of the legs 135, for vertical adjustment by means of screws 143 extending into the sides of the guide and disposed in vertical guide slots 144. This adjusting means is merely one of many suitable means which may be employed for accomplishing the desired result and also the guide 138 may be of any suitable type but is here shown as comprising a block body having a bottom portion 145 of a width substantially equal to the space between the leg portions 135a and upstanding sides 146 which have their outer faces in contact with the adjacent faces of the leg portions 135a and which provide with the bottom portion 145 a channel or recess 147 in which the end of the arm 138a is slidably positioned.

The upper portion of the channel 147 is closed by the insert 148 which engages the top of the portion of the arm lying in the guide channel, as shown in Fig. 17, whereby the arm is permitted smooth inward and outward movement in the channel. The screws 143, as shown in Fig. 17, engage in the lower portion 145 and extend through the side portions 146 into the insert 148 so as to retain the insert in position.

To facilitate the vertical adjustment of the sensing head, the insert 148 is provided with a T-slot 149 in which is swivelly engaged the head 150 of an adjusting screw 151. This adjusting screw is engaged in a threaded aperture 152 formed through a supporting plate 153 which is mounted upon the top ends of the portions 135a of the legs and thus it will be seen that upon rotation of this screw by means of the knurled head 154, limited up and down movement may be transmitted to the guide 138.

Secured to the underside of the guide 138 is a plate 155 which extends beyond the guide on the side thereof remote from the sensing head and has an upturned forked terminus 156.

Threaded upon the screw 142 which is carried by the arm 138a is a wheel nut 157 which has integral with it the peripherally slotted collar 158 in which the forked end 156 is engaged. Thus it will be seen that upon rotation of the wheel nut 157, it will be maintained in position by the forked end 156 of the plate 155 and, accordingly, the screw 142 will be caused to move axially through the nut and shift the sensing head inwardly or outwardly or, in other words, transversely of the program control tape extending thereacross.

It will be seen from the foregoing that desired up and down adjustment or horizontal adjustment may be made of the sensing head so as to bring it into proper position for the registration of the ports 140 with control apertures formed in the tape which, as previously described, is stretched across, between and attached to the arms extending rearwardly from the adjacent typewriter carriage.

Figs. 22 and 23 illustrate a novel, quick acting vacuum blocking valve forming a part of the control system. These valves are essentially of the same form or construction with the exception that the one shown in Fig. 22 is provided with a vacuum bleed connection communicating with the same chamber beneath the diaphragm as the control nipple.

In the valve structures there is a bottom plate 159 identified as the control plate which, preferably, is of metal and which has an aperture 160 therethrough leading into a control chamber 161 which is formed by an aperture 162 formed in the central portion of a gasket 163. Overlying and resting upon the gasket 163, is a spacer plate 164 which is preferably of metal and which has formed centrally therein an opening 165 of larger diameter than the opening 162 which forms a pocket for a sponge rubber block or filler 166. As shown, the thickness of this sponge rubber block or filler is the same as that of the spacer plate and the filler rests upon the gasket 163 and has its top surface flush with the top surface of the spacer plate.

Overlying the top of the spacer plate and filler block of sponge rubber is a diaphragm 167 of leather or other suitable material, and resting upon the top of this diaphragm is the top or impulse plate 168 through which are formed two passages 169 and 170 both of which open through the bottom face of the impulse plate within the area defined by the sponge rubber filler block.

For convenience of description, the passage 169 will be identified as the input passage and passage 170 will be identified as the output passage, and each of these passages has fixed therein a nipple to facilitate the connection of an air tube therewith, the input nipple being designated 171 and the output nipple designated 172.

The aperture 160 has a nipple 173 connected therewith to facilitate the attachment of an air tube for communication with the chamber 161.

In this embodiment of the blocking valve, the gasket 163 is provided with a lateral slot 163a and the control plate is provided with an aperture 174 which opens into the slot 163a through a constricted passage 174a while the outer end of the opening 174 has a nipple 175 connected therewith for the attachment of a vacuum line.

This embodiment of the blocking valve shown in Fig. 22 has been hereinbefore referred to and generally identified with the reference character 62. The simpler embodiment of the blocking valve which is here designated generally by the reference character 61, differs from the valve of Fig. 22 only in the fact that the gasket 163b is not provided with the recess 163a of the first embodiment, and the control plate 159a has only a single passage therethrough as indicated at 160a with which is connected an end of the nipple 173a. The other parts of this valve structure being the same as the valve of Fig. 22, the same reference characters are employed for like parts.

As hereinbefore stated, the primary and secondary valves illustrated in Figs. 25 and 26 respectively, are of known construction but, for convenience in following the flow diagram, sectional views of these valves are shown.

Fig. 33 illustrates in plan one of the program control tapes with the means for mounting the same between a pair of supporting arms on a typewriter carriage. This tape comprises a suitable strip or length of any satisfactory material such as paper, tracing linen or the like, which body of material is designated 176. Each end of the strip of material has secured thereto a tab 176a having an extended central portion 176b in which is formed an aperture 177.

To facilitate the positioning of the apertures in the program tape, the face of the tape may be provided with a series of spaced parallel lines providing the parallel paths 178, preferably corresponding in number with the vacuum ports in the sensing head over which the tape slides and each path being located so as to overlie one of the ports so that an aperture made in the tape in a selected path will come into registry with a port in the movement of the carriage of the typewriter to effect the desired impulse transmission by breaking the vacuum in the line previously closed by the tape.

Figs. 34 and 35 illustrate more or less diagrammatically a form filled out on the master typewriter machine and a tabulation on another sheet of selected material transmitted from the master machine, the reference character 179 designating the master machine typed form which may be in the nature of a freight bill and the reference 180 designating the manifest sheet typed on the slave machine. As will be seen, only selected portions of the material typed on the form 179 have been reproduced on the manifest sheet 180.

Referring particularly to Fig. 21, wherein the master sensing head 27m and the slave machine sensing head 52s are illustrated, it will be seen that there is a first group of three secondary valves 59 connected with a group of blocking valves 61 which, in turn, are connected to individual valves of a second group of secondary valves 60, each of which in turn is connected with a carriage return control bellows, one bellows being designed for operative connection with the slave machine key which effects the full carriage return, the second bellows being operatively connected with the slave machine key which effects the first partial return and the third bellows being operatively connected with the slave machine key which effects the s econd partial carriage return.

A second group of blocking valves, each designated 62, is illustrated.

The blocking valves 61 are of the form or type shown in Fig. 23.

The blocking valves of the second group designated 62 are of the type shown in Fig. 22, and each of these is connected with a program tape controlled port of the slave machine sensing head 52s and also with a tape controlled port of the master machine sensing head 27m, as illustrated.

The primary valve 57, detailed in Fig. 25, has the port $P^1$ connected by an air line 99 with that port of the impulse plate 26 which is opened by the actuation of a carriage return key of the master typewriter as, for example, the full carriage return key, and the first and second carriage return keys of the master typewriter are also each connected with an air admission port of the impulse plate connected with the line 181 and with the port $P^1$ of the primary valve 57 which, as before stated, is one of the battery 49 shown in Fig. 4, so that upon actuation of any one of the carriage return keys of the master typewriter, air impulse will be transmitted through the line 181 to the primary valve 57.

The port $P^2$ of primary valve 57 has an air line 182 leading therefrom to each of the ports in the control plate 168 of the blocking valves 61, as, for example, the input port 169, while the other or output port 170 of each blocking valve is connected by the line 183 with the impulse admission port $S^1$ of a secondary valve 60 while the vacuum port $S^2$ of each such secondary valve connects with one of the bellows 43, 44 or 45. The blocking valves 61 are normally closed.

The second primary valve 58 has the vacuum port V thereof connected with a suitable vacuum producing machine such as a vacuum pump designated 184, by the vacuum line 185 and leading from the vacuum port $P^2$ of this primary valve 58 is the vacuum line 186 which connects with the selector unit or pneumatic selector mechanism 42 of the slave machine. Also connected with the vacuum line 186 are the two lines 187 and 188 which connect respectively with the vacuum port $V^1$ of the primary valve 57 and the vacuum ports V of the secondary valves 60.

Connected with three vacuum ports of the master sensing head 27m designated "#1 C.R.," "#2 C.R." and "#3 Full" are the three air lines 186a, 187a and 188a respectively, each of which connects with the port $S^1$ of a secondary valve 59 as illustrated. These designations represent respectively the first carriage return, the second carriage return and the full carriage return for the respective carriage return bellows 44, 45 and 43, and running from each port $S^2$ of each secondary valve 59 is the air or vacuum line or tube 189 which connects with the control nipple 173a and port 160a of a blocking valve 61. From the diagram, it will thus be seen that the #1 carriage return port of the sensing head 27m is connected through the air line 186a, to a secondary valve 59, blocking valve 61 and secondary valve 60 with the first carriage return operating bellows 44. The second carriage return is connected with the air line 187a, secondary valve 59, blocking valve 61 and secondary valve 60, with the #2 carriage return bellows and the #3 Full carriage return port of the sensing head is connected through the line 188a, a secondary valve 59, blocking valve 61 and a secondary valve 60 with the full carriage return bellows 43.

Connected with the vacuum line 185, between the vacuum producing source 184 and the primary valve 58, is a vacuum line 190 from which leads the line 191 which is connected with tne vacuum port V of each of the secondary valves 59.

The master machine sensing head 27m is shown as having three additional tape controlled vacuum ports which are designated "on #1," "on #2," and "on #3." These ports have connected therewith and leading respectively therefrom the impulse air lines 191, 192 and 193 and each of these airlines connects with the control nipple 173 of a blocking valve 62. The blocking valve 62 which has the air line or impulse line 191 connected therewith has the input port 169 thereof connected by the line 194 with a tape controlled port of the sensing head 52s which is identified as "off #1."

The line 192 connects with the blocking valve 62 which has the input 169 thereof connected by the line 195 with the slave sensing head port identified as "off #2" and the line 193 connects with the blocking valve 62 which has the input port 169 connected by the line 196 with the tape controlled port of the slave sensing head which is identified as "off #3."

Each of the blocking valves 162 has the bleed passage 174 thereof connected with the vacuum line 190 as illustrated, so that when the system is in operation each of the blocking valves 62 will be normally opened, and when opened, the lines 194, 195 and 196 will be connected through the output ports 170 of these blocking valves with the line 197 which is connected with the port $P^1$ of the primary valve 58.

*Operation*

Preparatory to putting the control system into operation, the layout of the master form to be typed on the master typewriter and of the form to be typed on the slave machine are used as a guide for making in the master and slave machine control tapes the necessary apertures in the proper locations to effect the desired starting and stopping movements of the slave machine and the preparation of the carriage return actuating bellows of the slave machine for action when the full or intermediate carriage return devices are activated on the master machine. The tapes may be mounted in blank on the carriages of the two machines and the proper locations noted in the paths 178 for the subsequent formation of the control apertures.

In the operation of the system, the entire system is under vacuum by the pump 184 or from any other suitable source, through the primary valve 58 leading to the selector unit 42 of the slave machine and to primary valve 57 and the secondary valves 60.

Ahead of the primary valve 58, the vacuum is applied through the line 190 to the secondary valves 59 and the blocking valves 62.

If there is no aperture of the program control tape in registration with the ports of the master machine sensing head which are connected with the lines 186a, 187a and 188a, and any one of the three carriage return keys on the master machine is struck by the operator, an air impulse will be introduced into the line 99 through a port of the impulse plate 26. Such impulse is directed or passes to the primary valve 57 which admits a fresh or renewed pulse into the line 182 leading to the normally closed blocking valves 61. Up to this point, nothing further happens in the system because of the fact that the ports of the sensing head 27m of the master machine are closed by the program tape.

When an aperture in the program tape carried by the master machine carriage appears over and registers with one of the openings in the master machine sensing head as, for example, the opening or port identified as "#3 Full," an air impulse (atmospheric air) passes through the line 188a to the port $S^1$ of a secondary valve 59.

Actuation of this secondary valve 59, which is connected with the line 188a, results in the exhaustion of air from the line 189 which leads to the blocking valve 61 which is associated with the full carriage return bellows 43. This causes the diaphragm 167 of the valve 61 to be drawn down thus opening the valve. If at this stage, the operator strikes any one of the carriage return keys of the master typewriter machine opening the impulse valve element 89 of the impulse plate, an impulse is transmitted to the primary valve 57 which valve functions to give a renewed impulse to the line 182 directed to the open blocking valve input port 169, and this impulse passes through to the output port 170 into the line 183 leading to the secondary valve 60 connected with the bellows 43. The secondary valve 60 connected with the bellows 43 functions by the admission of the impulse at the port $S^1$, and the valve operates to establish communication between the vacuum line 188a and the port $S^2$ so that air is thus evacuated from the full carriage return operating bellows 43 to actuate the full carriage return mechanism of the slave typewriter machine.

The other carriage return bellows are operated in a similar manner upon the registration of an aperture in the program control tape passing over the sensing head 27m with one of the carriage return ports of that head.

The second function of the master and slave machine sensing heads is to start and stop the slave machine at predetermined positions in accordance with apertures in the predetermined positions in the program control tapes. This starting and stopping of the slave typewriter is accomplished as follows.

As the carriage on the slave typewriter moves the program tape is also moved with or by it over the air admission ports in the sensing head 52s, and upon the registration of an opening in the program tape carried by the slave carriage, with the "off #1" port, an air impulse is introduced into the line 194 and into the input port 169 of the blocking valve 62 with which the line 194 communicates. This blocking valve is normally open, as previously stated, due to the connection of the vacuum line with the port 174 thereof. The air impulse then passes through this valve to the output port 170 thereof and into the line 197 leading to the port $P^1$ of the primary valve 58. This air impulse actuates the primary valve, opening the latter to permit an air impulse to enter and pass through the port $P^2$ which is connected with the pneumatic selector mechanism thus deactivating this selector mechanism on the slave unit.

The air impulse will also pass through the lines 187 and 188 deactivating the primary valve 57 and the secondary valves 60. In other words, this action disconnects the vacuum producing source, the pump 184, from all of the units on the side of the primary valve 58 remote from the vacuum line 185.

As will be readily understood by those familiar with the art of vacuum operated typewriter mechanisms, such, for example, as that disclosed in the patent hereinbefore referred to and in the light of the foregoing description, prior to this admission of air impulse to the vacuum line 186, the carrying out of a typewriting operation on the master machine results through the actuation of the key levers in the opening of ports 88 in the impulse plate 26 and the transmission of impulses to the pneumatic selector mechanism which results in the actuation of the type keys of the slave machine corresponding to the keys manually operated on the master machine. However, upon the admission of an impulse into the port designated "off #1," whereby the actuation of the primary valve 58 is brought about in the manner stated, the vacuum normally applied to the pneumatic selector mechanism will be broken so that subsequent operation of typing keys on the master typewriting machine will have no effect upon the keys of the slave machine. Accordingly, under these conditions, typing may continue on the master machine while the slave machine remains idle until such time as an aperture in the master machine sensing head program tape comes into registration with the "on #1" port of the master machine sensing head. This will effect the restoration of the operative connection between the master and slave typewriters in the following manner.

An air impulse will be admitted to the line 191 which is connected with the control nipple 173 leading to the control port 162 of that blocking valve 62 with which the line 194 is connected. This impulse overcomes the bleed in the chamber 161 of the blocking valve 62, allowing the flexed diaphragm 167 to move to close off the ports 169 and 170. This shuts off flow of air through the "off #1" port of the sensing head 52s to the primary valve 58, restoring the valve to its original position where vacuum is reapplied to the line 186 leading to the pneumatic selector mechanism of the slave machine, the primary valve 57 and the secondary valves 60.

The system is now restored to a condition between the master and slave typewriter machines where any typing on the master machine will be duplicated by the slave machine. As this typing occurs, the carriages of both machines move together and slide the program tapes over the two sensing heads which moves imperforate portions of the tapes over and closes off all of the air admission ports in the two heads and this condition continues until another aperture in the slave tape opens an air admission port in the sensing head 52s to cut off the slave machine operation.

Where it is necessary to perform other or subsequent operations, where the location of apertures in the tapes, previously used, would interfere with such subsequent operation, combinations of apertures may be employed as, for example, two of the ports of the slave machine sensing head might be opened simultaneously to actuate the primary valve 58 and two corresponding apertures would then be required in the program control tape passing over the master sensing head 27m to operate or close the two blocking valves 62 which are connected with the opened two ports in the head 52s, to bring about re-establishment of the desired operative connection between the two machines.

As a practical illustration of the operation of the system of the present invention, reference may be had to Figs. 34 and 35 taken with the following description.

In Fig. 34, the numeral 179 generally designates a bill form which would be typed or filled out on the master machine.

On a manifest sheet such as that generally designated 180 in Fig. 35, a portion only of the material appearing on the bill form would be typed by the slave machine, the necessary starting and stopping and carriage return movements of the slave machine being effected by the cooperative action of the previously arranged apertures in the program control tapes connected with the carriages of the two machines and moving over the sensing heads to operate the several valves in the manner hereinbefore set forth.

At the start of the typing operation, the operator of the master machine will manually type the name of a shipper in the box 200 of the bill form and the same name will be automatically typed in the column 201 of the manifest sheet as shown.

Moving the carriages across together to the proper positions, the name of the consignee will then be typed in the second box designated 202 in the bill form and this name will be automatically typed by the slave machine in the second column 203 of the manifest sheet.

Continuing the carriage movements together, the box 204 will have the shipper's number typed therein as indicated and this will be automatically repeated in the column 205 of the manifest sheet. At this point, the program control tape of the slave machine, by means of a suitably placed aperture therein, would register with the sensing head port designated "off #1" to stop the slave machine.

The operator by actuating the proper intermediate carriage return key, then effects return of the carriage of the master machine to the proper position to type in the addresses in the boxes 200 and 202, and the date and other material in the horizontal column 206. When all the necessary material has been typed in the column 206, a full carriage return will then position the carriage for typing in the column 207, at which point the master machine program tape will have an opening therein over the port of the master sensing head 27m designated "on #1" to restore the operative coupling between the two machines.

Carriage return of the master machine only is then effected in the conventional manner without affecting the carriage return operating bellows of the slave machine since the master machine program tape would keep the carriage return ports of the master machine sensing head closed and therefore actuation of the carriage return keys of the master machine, while it would result in operating the valve elements of the impulse plate, would do nothing in the slave machine. Following the return of the carriage, typing of the first horizontal or cross line of material at 207 could be proceeded with and the slave machine would be operated to duplicate this typing along the line following the last material typed on the manifest sheet in the column 205. At the end of this line, the program control tape of the master machine could, through the registration of a properly located aperture therein with a partial carriage return port of the sensing head 27m, prepare the slave machine for the desired partial return of its carriage, which return would be effected simultaneously with the master machine upon the depression of the proper carriage return key of the master machine. The second horizontal line would then be typed across the bill form and would be reproduced as a second line below the first line of material on the manifest sheet.

Partial return of the two carriages would then again be effected in the same manner as previously described so as to permit the typing of the third line on the bill form and in the column 208 of the manifest sheet, and following the typing of the information "1 CTN SAW PARTS 18" a properly located aperture of the slave machine tape would effect the stopping of the slave machine in the manner described and the operator of the master machine could then continue to type the rest of the material to be put on the freight bill but which is not to appear on the manifest sheet.

Relative to the hereinbefore reference to the use of combinations of apertures, the following additional description is given. Assuming that the slave machine tape has one "off #1" hole to stop the slave while certain words are typed on the master machine, and the master machine tape then has one "on #1" hole to start the slave machine, then assume that the slave machine tape has a second "off #1" hole, or an "off #2" or an off #3"

hole, which causes the machine to stop while more material is typed only on the master machine. Then a second "on #1" hole or "on #2" or "on #3" hole in the master machine tape starts the slave machine. The slave machine may now, after a period of operation, have to remain idle while the master machine carriage makes a full return for additional typing and if one hole in the slave machine tape were again used to stop the slave machine a previously used hole in the master machine tape might start the slave machine at the wrong time, so a combination of two holes such as "off #1" and "off #2" holes, or "off #1" and "off #3," or "off #2" and "off #3," are provided in the slave tape to stop and hold the slave machine while typing is continued on the master machine and if a previously used single hole on the master machine tape uncovers a #1, a #2 or a #3 "on" hole of the master head, the slave machine will not be started because only one blocking valve 62 will be affected. Accordingly, in order to restore the working coupling between the two machines, the master machine tape will have to move a combination of two holes simultaneously in register with the "on #1" and "on #2" ports of the master head, or "on #1" and "on #3," or "on #2" thus closing the two blocking valves 62 through which the impulse was sent which operated the primary valve 58 and cut out the selector mechanism. The closing of these two blocking valves 62 restores the primary valve 58 to its original condition putting vacuum back on the selector mechanism, primary valve 51 and secondary valves 60.

With further reference to the novel blocking valve structure illustrated in Figs. 22, 23 and 24, in two embodiments, the sponge rubber filler performs several functions, which are; first, it cuts down the displacement factor of valve chamber 161; second, it functions to effect speedy return of the diaphragm 167; and, third, it applies a slight pressure against the diaphragm 167, assuring an airtight seal between the diaphragm and the impulse plate 168.

From the foregoing it will be seen that there is provided by the present invention a new and novel system by which automatic selection may be made of portions of material typed on a master machine, and a second or slave machine actuated in accordance with a prearranged program for the typing thereby of such portions without attention from the operator of the master machine or other person.

The invention also provides a new and novel mechanism for effecting transmission of control impulses from the manually operated keys of a master machine to selector actuating mechanism for corresponding keys of a slave machine, such new mechanism including a novel coupling between a harness unit and an impulse plate and said harness coupling including uniquely devised separable upper and lower portions, whereby the harness unit and impulse plate, and the upper and lower portions of the harness coupling may be freely separated or put together for cooperative action merely by lifting the typewriter machines associated therewith from their supporting bases, or placing the machine on their bases.

Other new and novel features of the invention reside in the blocking valves forming a part of the system; the sensing heads with which the program tapes coact and in the program tape per se.

We claim:

1. A typing system comprising a master typewriter, a slave typewriter, mechanism operatively coupling the typing keys of the two typewriters whereby manual actuation of the master machine keys will effect typing actuation of corresponding keys of the slave machine, means controlled by the master machine for effecting a predetermined carriage movement of the slave machine upon actuation of one key of the master machine, and cooperating means controlled by the carriage movements of the two machines for effecting predetermined stopping and starting of typing operation of the slave machine only.

2. A typing system according to claim 1, wherein the first named means includes a pneumatically actuated element operatively coupled with a carriage return key of the slave machine.

3. A typing system comprising a master typewriter machine, a slave typewriter machine, means associated with the slave machine for effecting individual key actuation thereof, means associated with the master machine and operatively coupled with the first means for actuating each of the typing keys of the slave machine upon actuation of the corresponding typing key of the master machine, pneumatic operating means operatively coupled with the carriage return actuating key of the slave machine, means controlled by the master machine for predeterminately preparing the pneumatic operating means for operation, means controlled by a carriage return key of the master machine which upon actuation of such key effects operation of the prepared pneumatic operating means, and cooperatively operating means associated with the slave and master machines for first operatively disassociating the first means from the slave machine to prevent actuation of the slave machine typing keys while the master machine keys are operated and then restoring the operative association of the said first means with the slave machine.

4. The invention according to claim 3, wherein the first means comprises a bank of vacuum operated actuators each of which actuators is coupled to a typing key and the second named means comprises a bank of valve elements each operatively coupled with an actuator with means operated by each typing key of the master machine and coupled to a valve element to open the latter and transmit an operating impulse to the actuator coupled therewith.

5. The invention according to claim 3, wherein the first means comprises a bank of vacuum operated actuators each of which actuators is coupled to a typing key and the second named means comprises a bank of valve elements each operatively coupled with an actuator with means operated by each typing key of the master machine and coupled to a valve element to open the latter and transmit an operating impulse to the actuator coupled therewith, said cooperatively operating means including an apertured control tape connected to and movable with the master machine carriage, an apertured control tape connected to and movable with the slave machine carriage, pneumatic valve means which when actuated from a first to a second condition effects the said disassociation of the first means from the slave machine, means controlled by the slave machine tape for actuating said valve means, and means controlled by the master machine tape for restoring said valve means to its first condition whereby the operative association of the first means with the slave machine is restored.

6. The invention according to claim 5, wherein the said means controlled by the slave machine tape includes a sensing head having ports under vacuum, one of which ports is uncovered by an aperture of the slave machine tape to actuate the pneumatic valve and the said means controlled by the master machine tape includes a sensing head having ports under vacuum one of which latter ports is uncovered by an aperture in the master machine tape to effect restoration of the pneumatic valve to its first condition.

7. In a system of operation for at least two typewriting machines in which one machine functions as a master and another functions as a slave, a master machine, a slave machine, mechanism forming an operative coupling between the machines whereby operation of the typing keys of the master machine effects actuation of the type bars of corresponding typing keys of the slave machine, and a pneumatic coupling system between said machines whereby starting and stopping of the slave machine is automatically effected while typing operations of the master machine continue and predetermined carriage return movements of the slave machine are effected upon actuation of the carriage return keys of the master machine, said coupling system including cooperating apertured program control tapes carried by the carriages of the machines for admitting atmospheric air impulses into the system in a predetermined order.

8. In a system of operation for at least two typewriting machines and in which one machine functions as a master and another functions as a slave, a master machine, a slave machine, mechanism forming an operative coupling between the machines whereby operation of the typing keys of the master machine effects actuation of the type bars of corresponding typing keys of the slave machine, and a vacuum controlled coupling system between said machines comprising vacuum operated units carried by the slave machine and each operatively coupled with a carriage return actuating key of the slave machine, a head member adjacent to the master machine and having an air admission port for each unit, a vacuum applying valve connected with each unit which when opened permits application of operating vacuum to the unit, an air impulse line leading to each of said vacuum actuated valves, a normally closed blocking valve in each of said lines, a vacuum controlled valve connected between each air admission port of said head and a blocking valve and functioning upon the admission of an atmospheric air impulse through the port to open the blocking valve connected therewith in preparation for transmission of an air impulse through the line, a normally closed impulse valve associated with the master machine and closing the impulse line, means connected with a carriage return key of the master machine for opening the last named valve to admit an air impulse to said line, said impulse flowing through the open blocking valve to the vacuum applying valve to actuate the latter for the application of operating vacuum to the unit connected therewith, means carried by the master machine carriage for opening an air admission port at a predetermined position of the carriage, a head member adjacent to the slave machine and having air admission ports, means carried by the slave machine carriage coacting with the slave machine head for opening a port of the last head to admit an air impulse thereinto, pneumatic means operatively coupled with the slave machine head ports whereby the opening of one thereof stops the functioning of said mechanism, the first head member having other air admission ports each identified in the system with one port of the head member of the slave machine, and other means carried by the master machine carriage for admitting an atmospheric air impulse to one of said other air admission ports, said pneumatic means also being connected with said other ports and adapted upon receiving an air impulse from one of said other ports to close off the path of the impulse admitted through the opened port of the slave machine head to effect the restoration of the functioning of the mechanism.

9. The invention according to claim 8, with a closed vacuum actuated valve in said line between said impulse valve and the blocking valve and opening upon admission of an impulse into the line by the impulse valve to introduce a boosting impulse into the line.

10. The invention according to claim 8, wherein the said pneumatic means operatively coupled with the slave machine head ports comprises blocking valves normally held open by vacuum and a primary valve in series connection between the slave machine head and the first stated mechanism, the impulse received through a port of the slave machine head passing through a selected open blocking valve to said primary valve and effecting vacuum operation of the latter for stopping said mechanism and the air impulse entering one of said other ports of the master machine head breaking the vacuum of the said selected open blocking valve to close the latter for effecting restoration of the primary valve to initial condition.

11. For use in an apertured program tape controlled vacuum system, a sensing head unit comprising a body having a top surface over which an apertured tape passes, a series of air passages therethrough each opening through a port in said top, means for coupling air tubes with said passages, a supporting structure, and means mounting the head on the supporting structure for effecting adjustment of the head in a vertical path and for effecting another adjustment of the head in a horizontal path.

12. The invention according to claim 11, wherein the last means comprises a guide to which the head is joined for horizontal translation, means connecting the head with the guide for producing such translation, a sliding coupling between the guide and the supporting structure permitting vertical movement of the guide and means operatively coupling the guide and supporting structure for effecting vertical movement of the guide and the head carried thereby.

13. For use in an apertured program tape controlled vacuum system, a sensing head unit comprising a frame having a pair of horizontally spaced vertical members, a guide body between said members, means connecting the guide body to the members for limited movement between the latter, means for effecting said movement, a sensing head body having a surface across which the tape is designed to move and having air passages therethrough connected to ports opening through said surface, means connected to said head and engaged in said guide body for sliding movement in the guide in a horizontal path, and a nut and screw coupling between the last means and the guide body for horizontally moving the last means and the head body connected thereto.

14. The invention according to claim 13, wherein the nut and screw coupling includes a forked element attached to and spaced from one side of the guide body, said screw extending from the said last means across the forked element and a circumferentially grooved collar carried by the nut and having the fork of the element engaged in the groove.

15. The combination with a typewriter in a vacuum system of the character described of a pair of arms attached to the typewriter carriage at opposite extremities of the latter and extending rearwardly therefrom, an elongate apertured program control tape, means coupling the ends of the tape to said arms whereby the tape is held longitudinally of the carriage, a sensing head comprising a body having a surface across which said tape is adapted to move and having air passages therethrough each in communication with a port opening through said surface, and means supporting said head in position to have said tape slide over the ported surface in the reciprocatory movements of said carriage.

16. The invention according to claim 15, with means for moving the sensing head transversely of the width of the tape to bring the ports and the apertures of the tape into proper position for registration upon movement of the tape across said head surface and means for moving the head in a direction perpendicular to the width of the tape to obtain firm contact between the tape and the head surface.

17. In a typewriter control system, in combination, an impulse unit designed for disposition beneath a typewriter machine and comprising a bar of a length to extend across the width of the machine, a plurality of valve elements movably carried by said bar in a row extending lengthwise of the bar and operating upon movement to open and close ports, a harness unit comprising a bar of a length to extend across the width of the machine, means facilitating attachment of the second mentioned bar to and across the underside of the machine, a plurality of straight key levers disposed in a row extending longitudinally of the second bar, each lever extending transversely of the second bar, means pivotally coupling the levers with the second bar, the spacing of the levers longitudinally of the second bar being the same as the spacing of the valve elements longitudinally of the first bar whereby the second bar when operatively positioned above the first bar will have an end of each lever above and in operative relation with a valve element, and means for facilitating the attachment of the other end of each lever with a key mechanism of the machine whereby actuation of the key mechanism will effect oscillation of a lever in a direction to actuate the valve element therebeneath.

18. An impulse unit comprising an elongate flat bar, said bar having an aperture therethrough, means for coupling a tube with the aperture on one side of the bar, a valve element upon the opposite side of the bar, said element comprising an elongate flat strip of flexible material attached at one end to the bar and extending across and covering the aperture, the other end of said element having a substantially right angled upturned terminal finger extending across the adjacent edge of the bar and rising above the said one side thereof, and a resilient strip member lying along and bearing against said element and urging the element toward the adjacent side of the bar into aperture closing position.

19. In a typewriter control system, a harness unit for establishing an operative coupling between keys of a typewriter machine and another unit, said harness unit comprising an elongate bar adapted to span the width of the machine beneath the keys, means for securing the bar to the machine, the bar including a longitudinal downwardly projecting flange, said flange having a longitudinal downwardly opening slot therein and a multiplicity of transverse slots spaced longitudinally thereof, a plurality of straight levers each disposed with a portion intermediate its ends positioned in a transverse slot, each of said levers in the said portion thereof having a pivot aperture therethrough aligned with the longitudinal slot, each of said levers further having a torsional twist whereby another portion thereof is positioned to lie in a plane perpendicular to the first portion, a pivot rod in and extending longitudinally of the longitudinal slot and passing through the pivot aperture of each lever, and means securing the pivot rod in the last named slot.

20. In a harness mechanism for operatively coupling keys of a typewriter machine with an actuating mechanism, a lower unit comprising an elongate bar of a length to span the width of the underside of a typewriter machine, means for supporting the bar beneath the machine, a pair of vertically spaced longitudinal flanges carried by the bar, slots formed transversely of each of said flanges, the slots of one flange being each in the vertical plane of a slot of the other flange, a plurality of elongate flat rock levers each disposed in two aligned slots of the flanges and projecting at each end beyond the adjacent flange, means extending longitudinally in the lower one of the flanges and passing through and supporting each lever for rocking movement, means facilitating the coupling of the lower end of each lever with actuating mechanism, and each lever having its upper end bifurcated.

21. In a harness mechanism for operatively coupling keys of a typewriter machine with mechanism for actuating the keys, in combination, an upper unit comprising a bar, means for securing the same transversely of the underside of a typewriter machine, a plurality of bellcrank levers pivotally supported by the bar in spaced relation longitudinally thereon for rocking movement on an axis extending longitudinally thereof, each lever having a horizontal arm with means for facilitating its connection with a machine key and a downwardly extending arm having a flat terminal portion, a lower unit comprising a bar, means for mounting the last bar in spaced parallel relation to and below the first bar, a plurality of elongate rock levers each pivotally supported in upright position in line with and below the said terminal portion of a bellcrank lever, said rock levers being rockable on an axis paralleling the rocking axis for the bellcrank levers, means upon the upper end of each rock lever for loosely receiving the flat terminal portion of the overlying bellcrank whereby rocking of the rock lever transmits rocking movement to the adjacent bellcrank, and means for coupling the lower end of each rock lever with said mechanism.

22. The invention according to claim 21, wherein the penultimate means comprises a bifurcation of the upper end of the rock lever formed by a V-notch opening at the bottom into a circular opening forming two spaced opposing points between which the said flat terminal portion is positioned.

23. For use in association with a ported sensing head in a pneumatic typewriter control system of the character stated, a ribbon of a sheet material of approximately the same length as a typewriter carriage, adapted to have apertures formed therein, and means carried upon each end of such ribbon for facilitating attachment of its ends to spaced supporting elements.

24. In a system of the character stated, in combination with a typewriter machine carriage and a ported sensing head adjacent to the rear thereof, a pair of elongate arms each secured at one end to an end of the machine carriage to extend rearwardly therefrom, an elongate ribbon of a sheet material adapted to have apertures formed therein, said ribbon being adapted to slide over the sensing head, an apertured mounting tab secured to each end of said ribbon, and means carried by the other end of each arm for engagement in the aperture of a tab whereby the ribbon is held stretched between the arms to be slid over said head in the working movements of said carriage.

25. The invention according to claim 24, wherein said arms are resilient and are held under tension by the ribbon supported therebetween whereby the ribbon is held taut.

26. In a typewriter control system, a harness unit for establishing an operative coupling between keys of a typewriter machine and another unit, said harness unit comprising an elongate bar adapted to span the width of the machine beneath the keys, means for securing the bar to the machine, the bar including a longitudinal downwardly projecting flange, said flange having a longitudinal downwardly opening slot therein and a multiplicity of transverse slots spaced longitudinally thereof, a plurality of levers each disposed with a portion intermediate its ends positioned in a transverse slot, each of said levers in the said portion thereof having a pivot aperture therethrough aligned with the longitudinal slot, a pivot rod in and extending longitudinally of the longitudinal slot and passing through the pivot aperture of each lever, and means securing the pivot rod in the last named slot, the opposing wall surface of the longitudinal slot having opposing longitudinal recesses therein in which the pivot rod engages, and said last means comprising a set screw extending into the longitudinal slot perpendicular to and engaging said rod and having threaded engagement with screw threads formed in said opposing wall surfaces.

27. The combination with a typewriter in a vacuum system of the character described of an elongate apertured program control tape, the ends connecting the tape to the carriage of the typewriter for movement therewith, a sensing head comprising a body having a surface across which said tape is adapted to slide and having air passages therethrough each in communication with a port opening through said surface, and means supporting said head in position adjacent to the typewriter carriage to have said tape slide over the ported surface in the reciprocatory movements of said carriage.

28. In a pneumatic typewriter control system of the character described the combination with a movable carriage and a sensing head having a row of ports therein, of a ribbon of a width approximately equal to the length of said row of ports and designed for longitudinal movement on said head over said row of ports, the ribbon being adapted to have apertures formed therein for registry with said ports, and means for attaching the ends of the ribbon to the movable carriage.

29. For use in association with a ported sensing head in a pneumatic typewriter control system of the character stated, a ribbon of a sheet material of approximately the same length as a typewriter carriage, having longitudinal rows of apertures formed therein for coaction with the ports of the sensing head, and means carried upon each end of such ribbon for facilitating attachment of its ends to spaced supporting elements.

30. As a new article of manufacture for use in association with a ported sensing head in a pneumatic typewriter control system of the character stated, a ribbon of a sheet material of approximately the same length as a typewriter carriage, impervious to air and adapted to have apertures formed therein for coaction with the ported sensing head, and means carried on each end of such ribbon for facilitating attachment of its ends to spaced supporting elements.

31. As a new article of manufacture for use in association with a ported sensing head in a pneumatic control system of the character stated, a ribbon of a sheet material of approximately the same length as a typewriter carriage, impervious to air and adapted to have apertures formed therein for coaction with the ported sensing head, and apertured tabs carried on each end of such ribbon for facilitating attachment of its ends to spaced supporting elements.

32. For use in a pneumatic machine control system wherein there is a reciprocable carriage, an apertured control ribbon having a length approximating that of the said carriage and designed for attachment at its ends to spaced parts of said carriage and maintained taut for reciprocal movement therewith, and means forming parts of the ends of said ribbon for attachment to said spaced parts.

33. The combination with the carriage of a typewriter in a system of the character described, of a pair of supporting members attached to said carriage in spaced apart relation longitudinally thereof, and an apertured control ribbon stretched lengthwise between said members and attached at its ends to said members.

References Cited in the file of this patent

UNITED STATES PATENTS

| | | |
|---|---|---|
| 443,252 | Chinnock | Dec. 23, 1890 |
| 503,776 | Saxe | Aug. 22, 1893 |
| 571,833 | Hunter | Nov. 24, 1896 |
| 726,560 | Neahr | Apr. 28, 1903 |
| 1,312,917 | McCormick | Aug. 12, 1919 |
| 1,496,358 | Pailthorpe | June 3, 1924 |
| 1,781,312 | Barton | Nov. 11, 1930 |
| 1,842,883 | Swanson | Jan. 26, 1932 |
| 1,991,729 | Brougham | Feb. 19, 1935 |
| 2,247,275 | Buckley | June 24, 1941 |
| 2,297,793 | Nichols et al. | Oct. 6, 1942 |
| 2,327,172 | Carlson | Aug. 17, 1943 |
| 2,464,608 | Rabenda et al. | Mar. 15, 1949 |
| 2,540,027 | Dodge | Jan. 30, 1951 |